Nov. 11, 1947.   F. H. HAGNER   2,430,814
PENDULOUS OPERATED AZIMUTH AND ZENITH RECORDING MEANS
Filed May 17, 1943   2 Sheets-Sheet 2
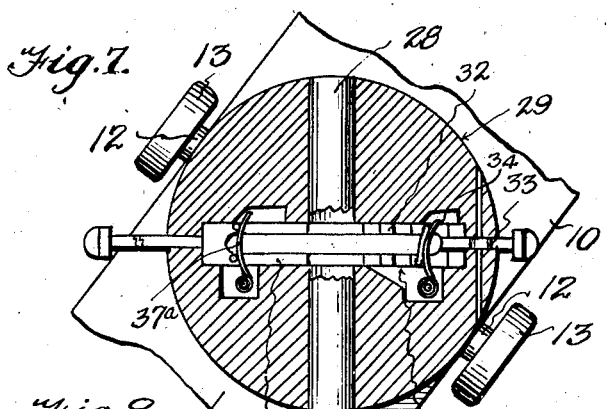
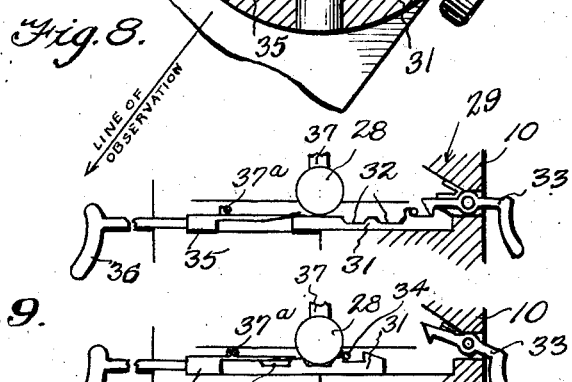
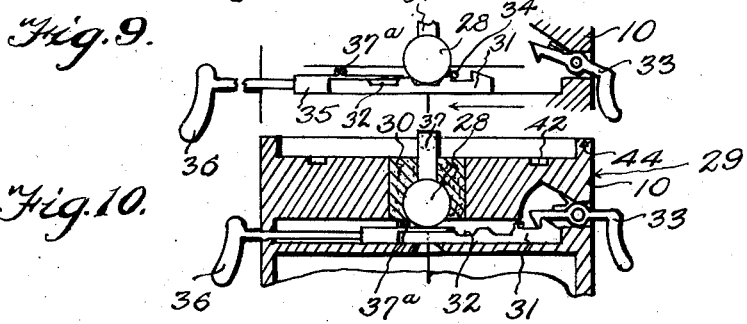
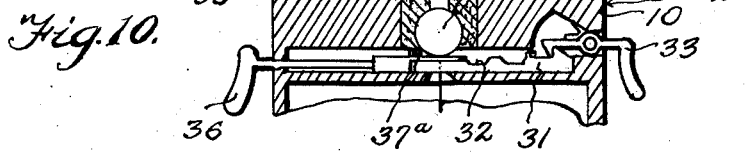
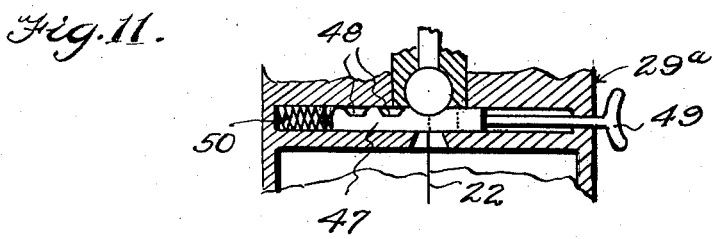
Inventor
FREDERICK H. HAGNER Patented Nov. 11, 1947

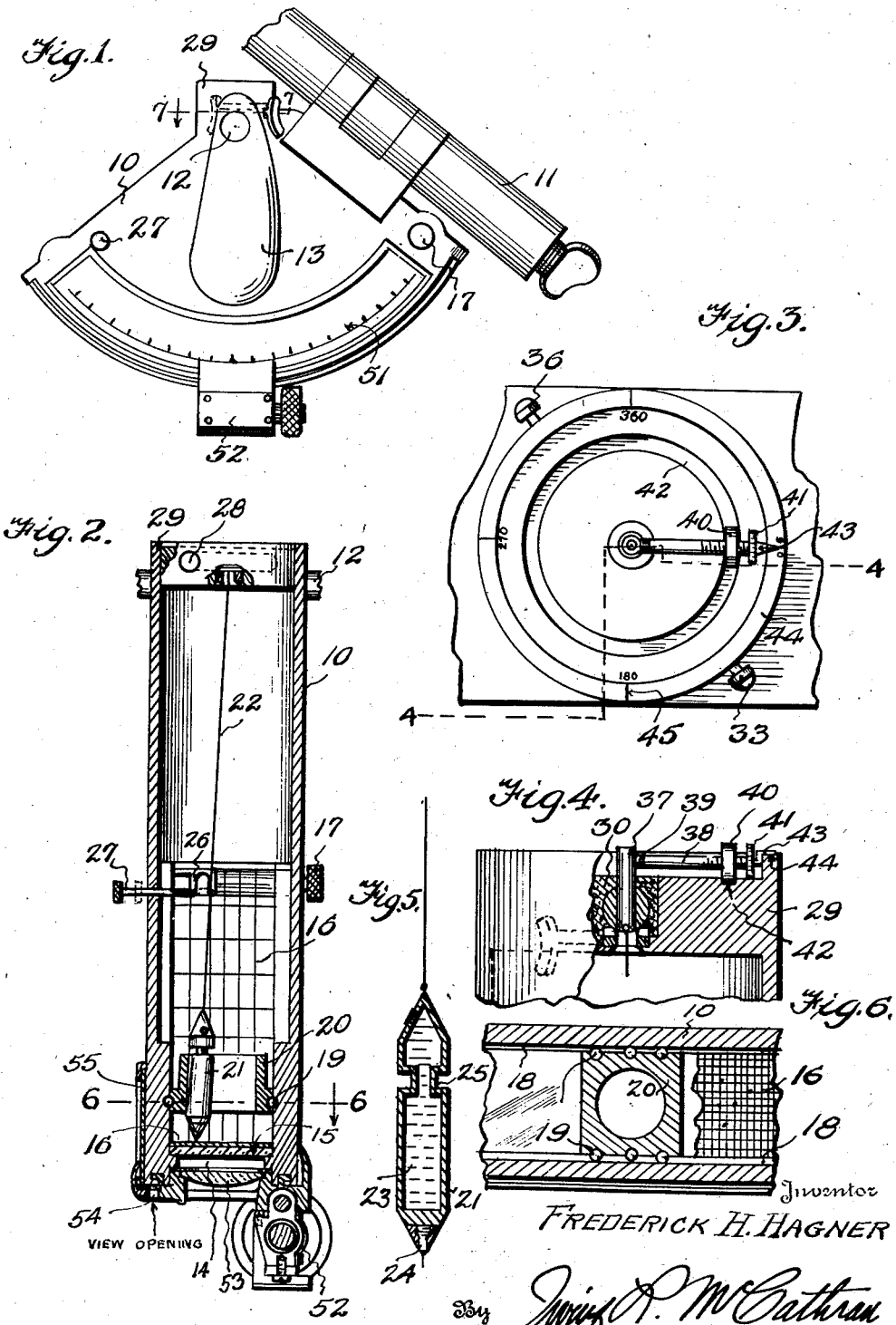

2,430,814

UNITED STATES PATENT OFFICE 2,430,814

PENDULOUS OPERATED AZIMUTH AND ZENITH RECORDING MEANS

Frederick H. Hagner, San Antonio, Tex.

Application May 17, 1943, Serial No. 487,374

6 Claims. (Cl. 33—216)

This invention relates to an instrument in the nature of an azimuth and zenith recording means, and has for one of its objects the production of a simple and efficient means for recording the position of an airplane during a series of intervals through the medium of a gravity-actuated plumb-bob in conjunction with a chart to indicate upon the chart the degree in which the plumb-bob varied from the true vertical during this series of intervals.

A further object of this invention is the production of a simple and efficient means for mounting the plumb-bob carriage within a sextant casing so as to permit the carriage to freely move from end to end of the casing.

Another object of this invention is the production of a simple and efficient means for reciprocating the plumb-bob without changing its angle so as to permit the plumb-bob to make a record of a series of its positions upon a chart.

Other objects and advantages of the present invention will appear throughout the following specification and claims.

In the drawings:

Figure 1 is a side elevational view of the instrument or sextant;

Figure 2 is a vertical sectional view through the plumb-bob recording means;

Figure 3 is a top plan view of the plumb-bob casing;

Figure 4 is an enlarged sectional view taken on line 4—4 of Figure 3;

Figure 5 is a vertical sectional view through the plumb-bob;

Figure 6 is a fragmentary sectional view taken on line 6—6 of Figure 2;

Figure 7 is a horizontal sectional view through the upper end of the casing taken on line 7—7 of Figure 1;

Figure 8 is a diagram of the plumb-bob reciprocating means in one position;

Figure 9 is a similar diagram with the parts in a second position;

Figure 10 is a transverse sectional view through the plumb-bob reciprocating means showing this means in a re-set position;

Figure 11 is a sectional view illustrating a modified type requiring only one trigger for actuating the plumb-bob.

By referring to the drawings it will be seen that 10 designates a segmental hollow casing which carries a telescope 11 at one side, and is adapted to be pivotally supported upon journals 12 carried by the handles 13. These handles 13 are adapted to be gripped by the observer so as to hold the instrument in a proper position for observation of a celestial body through the telescope 11.

The segmental casing 10 is provided with an open bottom 14 in which is mounted a transparent closure plate 15 over which is placed a suitable chart 16. This chart 16 may constitute a removable strip of paper having suitable designations marked thereon, such as shown in Figure 6, or it may be wound upon suitable rollers mounted at opposite ends of the segmental casing 10 and the chart 16 may be wound upon suitable rollers 17, if desired.

The casing 10 is provided near its lower end with a pair of parallel channels 18 upon the inner face thereof, which channels 18 provide trackways for the ball-bearings 19 carried by the plumb-bob shield 20.

The plumb-bob 21 is suspended within the shield 20 from a flexible suspension cord 22. The plumb-bob 21 is preferably filled with mercury, as indicated at 23, and carries a suitable marking device 24 of any desired type, such as a stylus, a pen, or pencil, which is removable for replacement when desired. This plumb-bob 21 is provided with an inset portion 25 near its upper end for fitting into a yoke 26 mounted near one end of the segmental casing 10, and a slidable pin 27 is carried by the yoke 26, which pin 27 may be moved to the dotted position shown in Figure 2 to lock the plumb-bob 21 at one end of the casing 10 and to also hold the shield 20 at one end of the casing when the device is not in use due to the fact that the plumb-bob 21 extends through the hollow shield 20 in the manner shown in Figure 2.

It should be understood that the chart 16 may be marked in any suitable or desired manner without departing from the spirit of the invention and the plumb-bob 21 is adapted to impinge a plurality of indentations or marks upon this chart 16 for the purpose of permitting an observer to calculate an average deflection of the instrument by observing the plurality of markings made by the plumb-bob 21 upon the chart 16.

In order to provide a proper means of lifting and dropping the plumb-bob 21 upon the chart 16, and thereby causing a plurality of marks to be made upon the chart, I have employed a special device illustrated in Figures 4 and 7 to 11 inclusive. A transversely extending supporting bar 28 is carried in the top or cap portion 29 of the segmental casing 10 and is preferably embedded within a sponge rubber cushion 30. This bar 28 rests upon a fluctuating member 31, which fluctuating member 31 is provided with recesses 32 in any suitable or desired number, in the upper face thereof. A finger-latch 33 engages one end of the fluctuating member 31 and normally holds the fluctuating member 31 in an inactive position. When the trigger 33 is released from the fluctuating member 31 the expansion spring 34 of any suitable type, will cause the fluctuating member to move to the position shown in Figure 9, and thereby raise and lower the bar 28 a plurality of times and consequently cause the plumb-bob 21 to be raised and lowered a similar number of times. The fluctuating member 31 may be reset by means of the resetting plunger 35 which is actuated by a trigger 36 in the manner illustrated in Figures 9 and 10. A return spring 37ª is adapted to return the resetting device 35 to its original position when the trigger 36 is released. The device is then in a position to again operate. While only two recesses 32 are illustrated, it should be understood that any desired number may be employed without departing from the spirit of the invention, and the parts have been shown enlarged for the purpose of illustration.

The bar 28 is preferably circular in cross-section. This bar 28 carries an upstanding stem 37 and the upper end of this stem is engaged by a radiating threaded rod 38, the connection being by means of a suitable universal joint 39. A wheel 40 is threaded upon the threaded rod 38 and this rod 38 carries a graduated finger wheel 41 which is fixed to the threaded rod 38, thereby causing the upstanding stem 37 to be moved slightly out of vertical alignment as the threaded rod 38 is rotated. The rotation of the graduated finger wheel 41 will cause the rod 38 to be moved longitudinally through the wheel 40, which wheel 40 is fixedly spaced in a set radius from the upstanding stem 37 by fitting in the circular track 42. The rod 38 may be swung to a selected position so as to have the indicator finger 43 register with a selected position in the graduated ledge 44. The rod 38 may therefore be set at a selected degree relative to the graduated ledge 44 and by the adjustment of the wheel 40 upon the length of the rod 38 the stem 37 may be tilted at a desired angle with respect to the true vertical. Since the wheel 40 fits in the circular track 42, the stem 37 will be held in this adjusted position both as to the vertical, as well as to the degrees of a circle. An indicator finger 43 is loosely carried at the outer end of the threaded rod 38 and overhangs the upper face of the ledge 44. The ledge 44 is graduated, as at 45, in degrees from 0 to 360°. By slightly changing the position of the upstanding stem 37, through the medium of this adjusting device, it is possible to correct errors of coriolis, reference being made to the Air Almanac of January 1944.

In Figure 11 there is shown a modified form of the invention wherein the plumb-bob suspending cord 22 is suspended from a suspending bar 46, this bar 46 resting upon a fluctuating member 47 having recesses 48 formed in the upper face thereof. An operating trigger 49 extends beyond the side of the neck portion 29ª, and an expansion spring 50 engages the opposite end of the fluctuating member 47. As the trigger 49 is depressed, the fluctuating member 47 will move inwardly, thereby fluctuating the bar 49, and when the trigger 49 is released, the expansion ring 50 will return the fluctuating member to its original position.

From the foregoing description, it should be understood that I have provided particularly a means for fluctuating a plumb-bob so as to provide a plurality of markings within a given time upon the chart, and I have provided means for fluctuating the suspending means of this plumb-bob, thereby providing a plurality of markings in somewhat of a similar manner to the markings provided by the dropping missile as shown in my previous Patent #2,219,990, issued October 29, 1940, and relating to an Angle determining device.

It should be understood that the pendulum or plumb-bob 21 is suspended in close proximity to the chart 16 so that vibrations of the ship carrying the device may in itself cause a plurality of markings to be made upon the chart 16, and in addition to this arrangement a positive vibrating mechanism is provided in the structure shown in Figures 7 to 11, inclusive.

The side of the casing 10 may be graduated, as indicated at 51, and a suitable reading device 52 of any desired type may be suspended below the segmental casing 10, and mounted so as to move along the bottom of the casing 10 to facilitate the reading of the marks upon the chart 16 through the transparent panel 15, and through the reading glass 53. This device 52 may be moved by means of a rack and worm gear structure, or by means of any other mechanical means, or this may constitute merely a sliding element, if desired. The lower edge of the housing 10 may be graduated, and these graduations may be viewed through the opening 54, if desired, and a suitable panel 55 may be carried upon the side of the casing 10 to provide means on which notations may be made for the convenience of the observer.

The important feature of the present invention resides in the pendulum mechanism, and the associated parts, and the fluctuating mechanism illustrated and described above.

Having described the invention, what is claimed is:

1. An instrument of the class described comprising a hollow casing, a pendulum having a marker suspended within said casing, a mark-receiving element carried within the casing and adapted to receive marks from the pendulum, the pendulum being adapted to cause a plurality of marks to be made upon the mark-receiving means within the casing, and a shield slidably mounted within the casing, said pendulum extending through the shield to confine the position of the pendulum to a restricted area relative to the mark-receiving means.

2. An instrument of the class described comprising a hollow casing, a pendulum having a marker suspended within said casing, a mark-receiving element carried within the casing and adapted to receive marks from the pendulum, a fluctuating means for raising and lowering the pendulum to cause a plurality of marks to be made upon the mark-receiving means within the casing, said casing comprising a segmental hollow structure having track channels formed therein, a shield having bearings working in said trackways and adapted to travel longitudinally of the trackways and to normally rest at a point in line with the pull of the center of gravity, and said pendulum extending through said shield, the shield providing a guide for the pendulum to confine the position of the pendulum to a restricted area relative to the mark receiving means.

3. An instrument of the class described comprising a hollow casing, a pendulum, a flexible suspending element suspending said pendulum within the casing, a mark-receiving element adapted to receive marks from the pendulum, a fluctuating device for raising and lowering the pendulum, said fluctuating device comprising a supporting member, and an agitating member having a rippled supporting face for engaging and supporting said supporting member.

4. An instrument of the class described comprising a hollow casing, a pendulum, a flexible suspending element suspending said pendulum within the casing, a mark-receiving element adapted to receive marks from the pendulum, a fluctuating device for raising and lowering the pendulum, said fluctuating device comprising a supporting member, an agitating member having a rippled supporting face for engaging and supporting said supporting member, said fluctuating device comprising a transversely movable member adapted to move transversely of and under the supporting member, and means for returning the fluctuating device to its normal position.

5. An instrument of the class described comprising a support, a marking pendulum adapted to hang in line with the central longitudinal axis of said support, a means for receiving marks from the pendulum, a flexible suspending element, a supporting member to which the suspending element is connected at a point of suspension, and lateral and circumferentially shiftable means for shifting the position of the supporting member to change the position of the point of suspension of the flexible suspending element relative to the longitudinal axis of the support.

6. An instrument of the class described comprising a marking pendulum, a means for receiving marks from the pendulum and normally in close proximity with said pendulum, a flexible suspending element for suspending said pendulum in line with the line of normal pull of gravity, a supporting member to which the suspending element is connected at a point of suspension, lateral shiftable means for shifting the position of the supporting member to change the position of the point of suspension of the flexible suspending element relative to the line of normal pull of gravity, said lateral shiftable means comprising a threaded rod engaging the supporting member, a guiding wheel threaded upon said rod, a circular trackway for receiving said wheel, means for facilitating the rotation of the threaded rod to laterally shift the supporting member, and a circular scale for indicating the position of the lateral shiftable means within the radius of the circular scale.

FREDERICK H. HAGNER.

REFERENCES CITED

The following references are of record in the file of this patent:

UNITED STATES PATENTS

| Number | Name | Date |
|---|---|---|
| 498,084 | Rogers | May 23, 1893 |
| 1,110,897 | Comstock | Sept. 15, 1914 |
| 1,895,615 | Elliott | Jan. 31, 1933 |
| 1,962,045 | Walton | June 5, 1934 |
| 1,981,665 | Rieber | Nov. 20, 1934 |
| 2,219,990 | Hagner | Oct. 29, 1940 |

FOREIGN PATENTS

| Number | Country | Date |
|---|---|---|
| 11,628 | Great Britain | 1908 |